United States Patent [19]
Ohta et al.

[11] 4,414,650
[45] Nov. 8, 1983

[54] MAGNETO-OPTIC MEMORY ELEMENT

[75] Inventors: Kenji Ohta, Yao; Akira Takahashi; Toshihisa Deguchi, both of Nara, all of Japan

[73] Assignee: Sharp Kabushiki Kaisha, Osaka, Japan

[21] Appl. No.: 275,388

[22] Filed: Jun. 19, 1981

[30] Foreign Application Priority Data

Jun. 23, 1980 [JP] Japan .................................. 55-85695
Jul. 23, 1980 [JP] Japan ................................ 55-101604
May 8, 1981 [JP] Japan .................................. 56-70284

[51] Int. Cl.$^3$ ............................................. G11C 13/04
[52] U.S. Cl. ..................................... 365/122; 365/121
[58] Field of Search ............................... 365/121, 122

[56] References Cited
U.S. PATENT DOCUMENTS 3,872,451 3/1975 McNaney ........................... 365/122

Primary Examiner—Terrell W. Fears
Attorney, Agent, or Firm—Birch, Stewart, Kolasch & Birch

[57] ABSTRACT

A magneto-optic memory medium comprises a reflector exhibiting reflectance for light used for information reproduction and a magneto-optic magnetization film disposed on the reflector. When light is applied for information reproduction, the light impinges on the magnetization film and reaches the reflector. The light reflected through the reflector and the magnetization film is of use for information reproduction. In a preferred form of the magneto-optic memory medium, there is deposited on a transparent substrate a magnetic film having an axis of easy magnetization perpendicular to its surface. The magnetization film is overlaid with a reflective coating which is shaped into a strip configuration.

4 Claims, 4 Drawing Figures

MAGNETO-OPTIC MEMORY ELEMENT

BACKGROUND OF THE INVENTION

This invention relates to a magneto-optic memory element with which writing, reading and erasing of information are performed through application of a laser beam.

In recent years, a substantial amount of effort has been directed toward the development of an optical memory medium which satisfies various requirements including high density, large capacity and high speed access.

Of a wide range of optical memory media, magneto-optic memory elements comprising a perpendicular magnetization layer as a memory material are most attractive due to its unique advantage that information can be erased after use and new information can be written thereon. The magneto-optic memory elements however have the disadvantage that they provide weak reproduced signals and exhibit poor noise-to-signal ratio (S/N ratio). Especially when reproducing information relying upon reflected light from the magneto-optic elements using the Kerr effect, the Kerr rotation angle of magnetic material is small and an improvement in S/N ratio is almost impossible. For this reason the prior art attempted to increase the Kerr rotation angle by improvement of magnetic material as a recording medium and deposition of such a dielectric film as SiO and $SiO_2$. It was reported in "IEEE Trans. on Mag.", Vol. Mag-16, No. 5, 1980, P1194, for example, that the Kerr rotation angle increased from 0.15° to 0.6° by deposition of a SiO coating on a TbFe magnetic thin film as an example of the latter. However, while the deposition of such a dielectric coating on a magnetic film increases the Kerr rotation angle, it decreases the amount of the reflected light (for example, the amount of reflected light falls from 50% to 10% with the above mentioned combination of TbFe and SiO). An improvement in S/N ratio is, therefore, theoretically not expected. In the case that the dielectric thin film typically of SiO and $SiO_2$ is deposited, it can not protect the magnetic material against corrosion. It is also impossible to sense recording bits when the diameter of the recording bits is of the order of 1 um and dust or other foreign objects are of a diameter of approximately 1 um. It is therefore desirable that the thickness of the memory elements be between 0.5 and 2 mm for practical application. However, this requirement is in conflict with the above discussed requirement of increasing the Kerr rotation angle.

It has been suggested that an amorphrous magnetic film such as DyFe be deposited on a garnet substrate and information recorded on the DyFe film may be transferred to the garnet substrate of good S/N ratio for readout (e.g., "Digest of the Fourth Annual Conference on Magnetics in Japan", 5a B-4). However, this method does not appear to be suitable for large capacity memory application because of difficulty in making a large area memory medium.

Apart from the foregoing problems, high density recording is indispensable for optical memory elements. Accordingly, since the diameter of the recording bits is of the order of 1 um as stated previously, survo technique including a focus survomechanism and a track survomechanism is necessary during writing, reading and erasing. Otherwise, there is the need for a recording mechanism which is too complex and too precise for practical application. Unlike the Philips video disk equipment of the MCA type which requires only reproducing information previously recorded, the magneto-optic recording device should write new information at the position where no information is contained, when the track survomechanism is in use. It is therefore desirable that guide tracks be formed in parallel with signal-recording tracks for helping the survomechanism.

OBJECTS AND SUMMARY OF THE INVENTION

With the foregoing in mind, it is an object of the present invention to provide a magneto-optic memory medium wherein guide tracks are available for a survomechanism with magneto-optic enhancement without decreasing the amount of reflected light.

According to an aspect of the present invention, a magneto-optic memory medium comprises a reflector exhibiting a proper reflectance for light used for information reproduction and a magneto-optic magnetization film disposed on said reflector. When light is applied for information reproduction, the light impinges on the magnetization film and reaches the reflector. The light reflected through the reflector and the magnetization film is of use for information reproduction.

In a preferred form of a magneto-optic memory medium, there is deposited on a transparent substrate a magnetic film having an axis of easy magnetization perpendicular to its surface. The magnitization film is overlaid with a reflective coating which is shaped into a strip configuration.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

Figure 1:
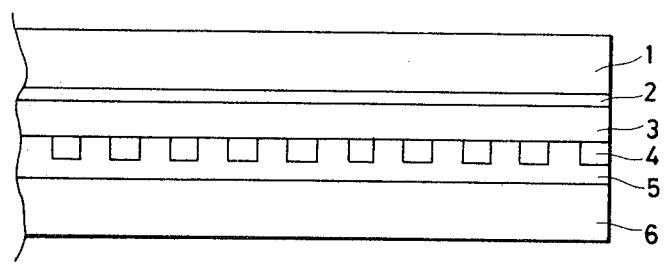
FIG. 1 is a cross sectional side view showing part of a magneto-optic memory element according an embodiment of the present invention.
Figure 2:
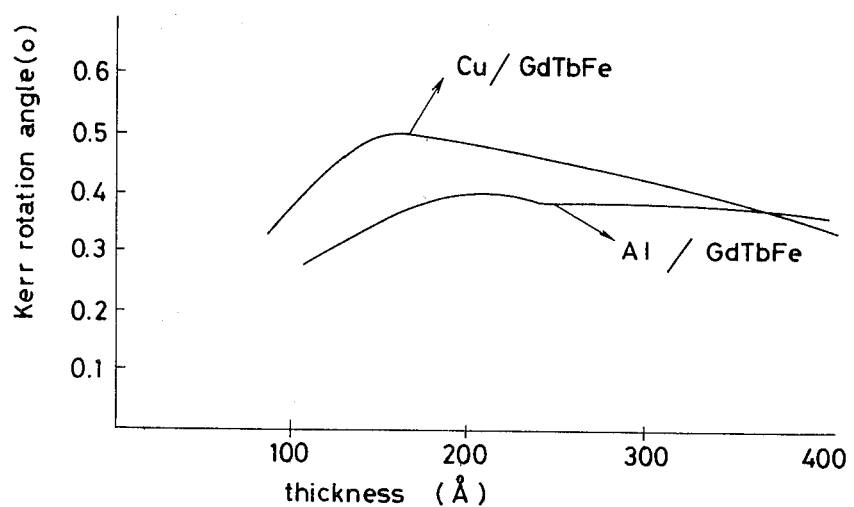
FIG. 2 is a graph showing the Kerr rotation angle dependency of a GeTbFe film on the thickness of a reflective coating.

FIG. 1 is a partially enlarged cross sectional side view of a magneto-optic memory element according to an embodiment of the present invention. On a substrate 1 of glass or plastic such as PMMA is a perpendicular magnetization layer 2 of amorphrous ferromagnetic material consisting of rare earth metal and transition metal, for example, GdTbFe and TbDyFe, deposited by sputtering, evaporation or other well known methods. The amorphrous layer 2 is overlaid with a transparent dielectric layer 3 typically of $SiO_2$, SiO, MgF, $TiO_2$ or the like which in turn is overlaid with a reflector layer 4 made of Cu, Au, Ag, Zn, Sn or the like with a strip-shaped configuration. Although dependent upon the wavelength of a laser beam used in the optic memory device, the kind of the amorphrous layer 2 and the kind of the reflector layer 4, the optimum thickness of the amorphrous layer 2 is between 50-300 Å. More particularly, it is approximately 150 Å with a GdTbFe layer, a HeNe laser and a Cu reflector layer and approximately 200 Å with a GeTbFe layer, a 8300 Å semiconductor lazer and a Cu reflector layer. FIG. 2 depicts the relationship between the thickness of the GdTbFe and the Kerr rotation angle especially in the case of Cu and Al reflector layers. The wavelength used was 6328 Å. Taking into account the fact that the Kerr rotation angle is 0.27° with only the GdTbFe layer, it is clear that the GdTbFe layer exhibits superiority over other amorphrous layers. With Ag and Au reflector layers, the same curve as with the Cu layer is also available. It is noted that the transparent dielectric layer 3 is provided as a heat insulating layer in order to prevent heat applied to the magnetic layer 2 from escaping into the reflector layer 4 when the Curie point recording or the compensation point recording is carried out on the amorphrous magnetic layer 2. The Kerr rotation angle is greatly influenced by the thickness of the dielectric layer 3. Accordingly, the thickness of the dielectric layer 3 is properly selected based upon the kind of the magnetic layer 2, the material comprising dielectric layer 3 and the reflector layer 4, the wavelength used, etc. For example, when the GdTbFe layer, the $SiO_2$ dielectric layer and the Cu reflector layer and the HeNe laser of a wavelength of 6328 Å are used, it is preferable that the thickness of the $SiO_2$ layer be approximately 2000 Å. It is also preferable that the thickness be approximately 2700 Å with a semiconductor laser of 8300 Å.

It is generally essential that the thickness of the dielectric layer 3 be an integer multiple of $\lambda/2n$ where $\lambda$ is the wavelength of the light source and n is the refractive index of the dielectric layer 3. Strip-shaped guide tracks are formed in the reflector layer 4. Alternatively, strip-shaped tracks may be formed which bear information in a given interval in connection with track identifying numbers and, if necessary, sector identifying numbers. An adhesive layer 5 protects the reflector layer 4 with the guide tracks and comprises an adhesive which shows good adhesion between a support 6 and the reflector layer 4.

Figure 3:
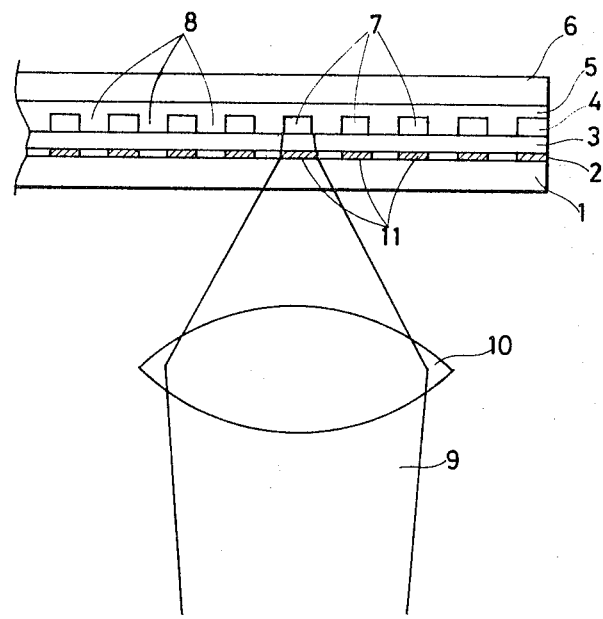
FIG. 3 is a partially enlarged cross sectional side view showing the magneto-optic memory element illuminated with a laser beam.

FIG. 3 illustrates the magneto-optic memory medium according to the present invention in operation. A laser beam 9 focused through a condenser lens 10 is directed toward the tracks 7 in the reflector layer, 4 so that writing, reading and erasing information are carried out while a portion 11 of the magnetic layer 2 corresponding to the reflector layer portion 7 serves as a recording track. By the provision of the reflector layer 7, it is possible to increase the Kerr rotation angle with improved S/N ratio during reading. Moreover, by the provision of the dielectric layer 3, it is possible to prevent heat from escaping into the reflector layer portion 7 focilitating reduced laser power during writing. The remaining portion of the magnetic layer which does not correspond to the laser beam is used as the guide tracks. Since light returning from the remaining portion 8 of the reflector layer is small, it is easy to find that the laser beam is spotted out of the recording tracks 11.

Figure 4:
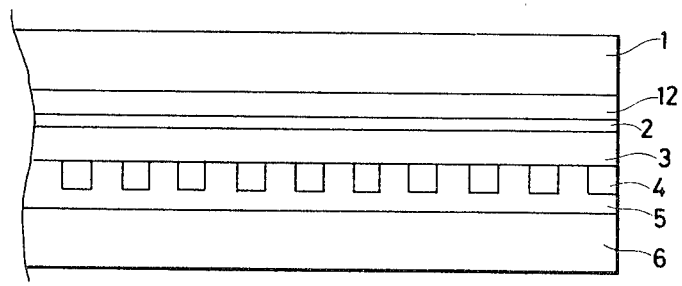
FIG. 4 is a partially enlarged cross sectional view of the magneto-optic memory element according to another embodiment of the present invention.

FIG. 4 shows in a partially cross sectional side view another embodiment of the present invention. The distinction over the previous embodiment is that a dielectric layer 12 exhibiting a refractive index greater than the refractive index of the substrate 1 (e.g., ZnS, SiO or $TiO_2$) is provided between the substrate 1, made of glass or PMMA resin, and the magnetic layer 2. Otherwise, the second embodiment is same as the first embodiment shown in FIG. 1. The object of the dielectric layer 12 is to further increase the Kerr rotation angle and improve S/N ratio as compared with the magneto-optic memory element of FIG. 1.

One significant feature of the present invention resides in that the reflector coating is provided for magneto-optic enhancement. Further, the reflector coating is strip-shaped to define the guide tracks. It will be obvious to those skilled in the art that the present inventive concept is applicable to various configurations. For example, materials available as the magnetic layer may be GdBiFe, GdSnFe, GdPbFe, GdYFe, TbFe, DyFe, MnBi and MnBiCu in addition to GdTbFe and DyTbFe as stated above. In addition, the support 6 may be eliminated as long as the adhesive layer 5 bears a sufficient physical strength. The magneto-optic memory medium may be of a two sided configuration including symmetrical sets of the layers 1 through 4 mounted on the support 6.

The information of the guide tracks may be accomplished by chemical etching, dry etching or laser cutting. It is further preferable that the magnetic layer be protected and shielded by an adhesive layer against the ambient to avoid corrosion.

While only certain embodiments of the present invention have been described, it will be apparent to those skilled in the art that various changes and modifications may be made therein without departing from the spirit and scope of the invention as claimed.

What is claimed is:
1. A magneto-optic memory medium comprising:
a reflector for reflecting light used for information reproduction;
a magneto-optic magnetization film having an axis of magnetization perpendicular to its surface disposed adjacent said reflector; and
means for directing light onto said magnetization film from a position on a side of said film opposite said reflector;
wherein, when light is applied for information reproduction, the light passes through said magnetization film to said reflector and is reflected by the reflector back to said magnetization film for use in information reproduction.
2. A magneto-optic memory medium comprising:
a reflector for reflecting light used for information reproduction;
a magneto-optic magnetization film disposed adjacent said reflector; and
means for directing light onto said magnetization film from a position on a side of said film opposite said reflector;
wherein, when light is applied for information reproduction, the light passes through said magnetization film to said reflector and is reflected by the reflector back to said magnetization film for use in information reproduction;
wherein said reflector comprises a plurality of strip portions defining guide tracks.
3. A magneto-optic memory medium comprising:
a reflector for reflecting light used for information reproduction;
a magneto-optic magnetization film spaced from said reflector; and means for directing lgiht onto said magnetization film from a position on a side of said film opposite said reflector;

wherein, when light is applied for information reproduction, the light passes through said magnetization film to said reflector and is reflected by the reflector back to said magnetization film for use in information reproduction.

4. A magneto-optic memory medium comprising:

a reflector for reflecting light used for information reproduction;

a magneto-optic magnetization film disposed adjacent said reflector;

an optically transparent layer between said reflector and said magnetization film; and means for directing light onto said magnetization film from a position on a side of said film opposite said reflector;

wherein, when light is applied for information reproduction, the light passes through said magnetization film to said reflector and is reflected by the reflector back to said magnetization film for use in information reproduction.

* * * * *